United States Patent
Binshtok et al.

(10) Patent No.: US 7,054,607 B2
(45) Date of Patent: May 30, 2006

(54) METHOD AND APPARATUS FOR REDUCING DC OFFSET IN A WIRELESS RECEIVER

(75) Inventors: Nir Binshtok, Tel Aviv (IL); Boaz Pianka, Kohav Yair (IL)

(73) Assignee: Intel Corporation, Santa Clara, CA (US)

(*) Notice: Subject to any disclaimer, the term of this patent is extended or adjusted under 35 U.S.C. 154(b) by 572 days.

(21) Appl. No.: 10/260,856

(22) Filed: Sep. 30, 2002

(65) Prior Publication Data

US 2004/0063417 A1    Apr. 1, 2004

(51) Int. Cl.
*H04B 1/10* (2006.01)
(52) U.S. Cl. ............. 455/311; 455/255; 455/265; 455/141; 455/296
(58) Field of Classification Search ............. 455/311, 455/67.11, 67.13, 73, 76, 550.1, 130, 136, 455/137, 138, 141, 200.1, 234.1, 240.1, 255
See application file for complete search history.

(56) References Cited

U.S. PATENT DOCUMENTS

| | | | |
|---|---|---|---|
| 6,753,727 B1 * | 6/2004 | Magoon et al. ............... 330/9 |
| 6,859,506 B1 * | 2/2005 | McCorkle ................. 375/346 |
| 6,868,128 B1 * | 3/2005 | Lane ....................... 375/319 |
| 6,903,606 B1 * | 6/2005 | Yan et al. ................... 330/9 |
| 2002/0042256 A1 * | 4/2002 | Baldwin et al. .......... 455/232.1 |
| 2002/0058491 A1 * | 5/2002 | Minnis et al. ............. 455/323 |
| 2003/0035499 A1 * | 2/2003 | Staszewski et al. ........ 375/346 |

\* cited by examiner

*Primary Examiner*—Nguyen T. Vo
*Assistant Examiner*—Thuan T Nguyen
(74) *Attorney, Agent, or Firm*—Schwegman, Lundberg, Woessner & Kluth, P.A.

(57) ABSTRACT

DC offset is estimated in a wireless receiver during a period when receive energy is blocked from reaching a mixer within the receiver. The estimated DC offset value may then be used to reduce DC offset within the wireless receiver when a receive signal is subsequently being processed.

30 Claims, 5 Drawing Sheets

METHOD AND APPARATUS FOR REDUCING DC OFFSET IN A WIRELESS RECEIVER

BACKGROUND OF THE INVENTION

A direct conversion receiver is a receiver that down converts a received signal directly to baseband. A problem often experienced in direct conversion receivers is the generation of a relatively large direct current (DC) offset at the output of a radio frequency section of the receiver. This DC offset may be several times larger in magnitude than the signal being processed in the receiver. As can be appreciated, the presence of this DC offset can seriously compromise the subsequent demodulation of the received signal. Thus, there is a general need for techniques and structures for reducing DC offset in a wireless receiver.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within the disclosed embodiments may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to methods and structures for reducing DC offset in a wireless receiver. The DC offset at the output of the radio frequency (RF) section of a receiver is estimated during a period when a received signal is blocked from reaching the input of a down conversion mixer within the RF section. The estimated offset value may then be subtracted from the output of the RF section, to reduce a DC component therein, when the received signal is again permitted to reach the mixer. The inventive principles may be implemented in any wireless receiver using one or more mixers to down convert a received signal. The inventive principles are particularly advantageous when used in connection with direct conversion receivers.

Figure 1:
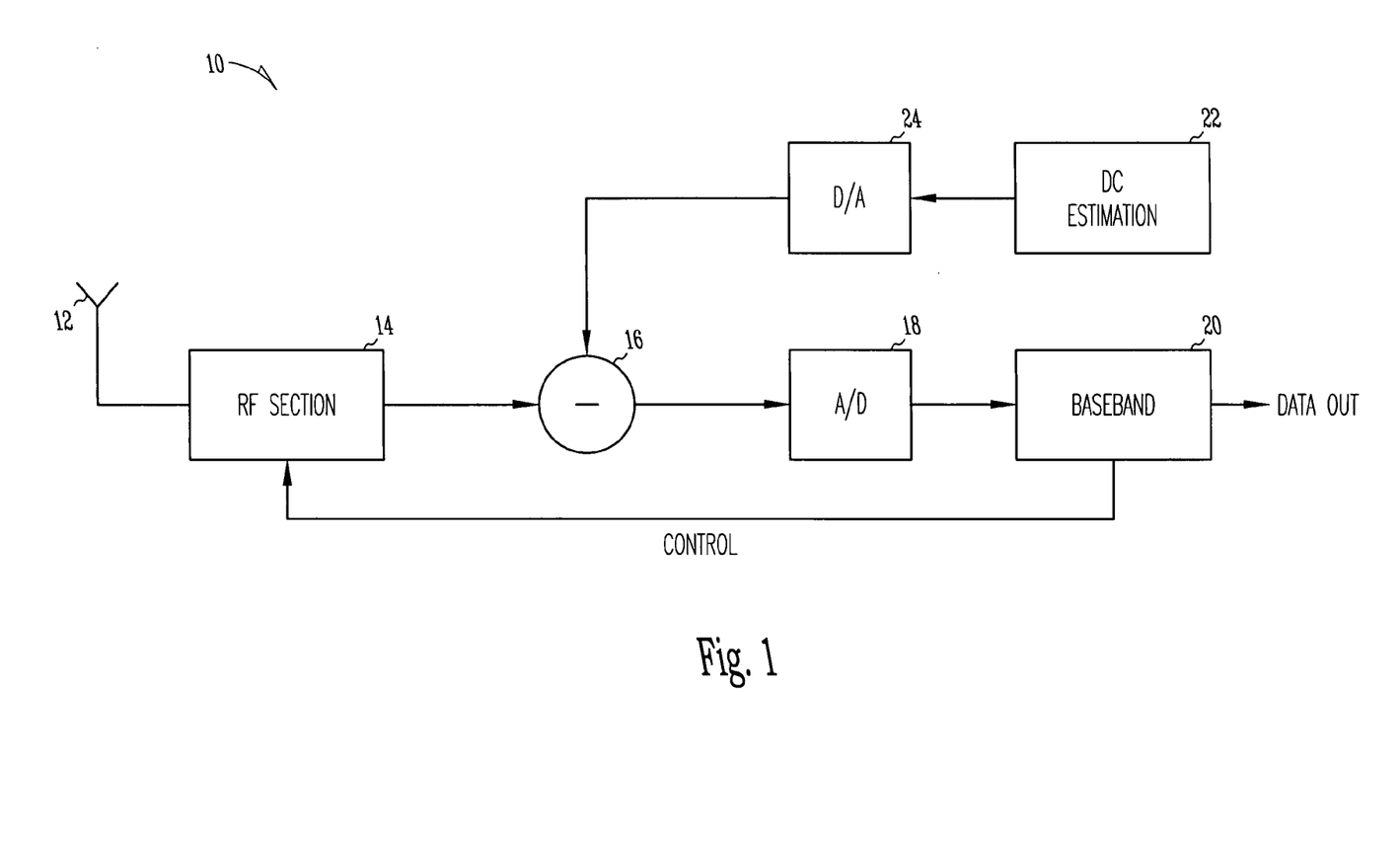
FIG. 1 is a block diagram illustrating a wireless receiver in accordance with an embodiment of the present invention.

FIG. 1 is a block diagram illustrating a wireless receiver 10 in accordance with an embodiment of the present invention. As illustrated, the wireless receiver 10 includes: a receive antenna 12, an RF section 14, a subtractor 16, an analog-to-digital (A/D) converter 18, a baseband controller 20, a DC estimation unit 22, and a digital-to-analog (D/A) converter 24. It should be appreciated that the individual blocks illustrated in FIG. 1 (and other block diagrams herein) are functional in nature and do not necessarily correspond to discrete hardware elements. For example, in at least one embodiment, two or more of the blocks are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above.

The receive antenna 12 may be almost any type of antenna operative for receiving a wireless signal from a wireless communication channel. The RF section 14 processes the signal received by the receive antenna 12 and ultimately generates a baseband representation thereof. As will be described in greater detail, the subtractor 16 (e.g., a difference amplifier) subtracts a DC offset estimate from the baseband signal output by the RF section 14 at an appropriate time. The A/D converter 18 converts the baseband signal to a digital format. The digitized signal is then delivered to the baseband controller 20 for further processing. The baseband controller 20 may, among other things, demodulate the digitized signal to extract information from the signal that is intended for delivery to a user associated with the receiver 10. The RF section 14 includes at least one mixer for use in down converting a received signal to baseband. During receiver operation, this at least one mixer may result in a DC offset appearing at the output of the RF section 14. The DC estimation unit 22 estimates the DC offset at the output of the RF section 14. The DC offset estimate may then be converted to an analog representation within the D/A converter 24 and be subtracted from the output signal of the RF section 14 in the subtractor 16. Although illustrated as separate units, the baseband controller 20 and the DC estimation unit 22 will typically be implemented within a common processor.

In conceiving the present invention, it was appreciated that the DC offset at the output of a down conversion mixer typically results from local oscillator (LO) leakage and/or mixer imbalance and is typically independent of the received signal. Thus, it was determined that the DC offset is best measured while little or no received signal is being applied to the mixer. Therefore, in one aspect of the present invention, DC offset estimation is performed in a wireless receiver during a period when the received signal is blocked from reaching the mixer. In the embodiment illustrated in FIG. 1, for example, the baseband controller 20 may deliver a control signal to the RF section 14 to activate a signal blocking device therein at an appropriate time to prevent a signal received by the antenna 12 from reaching a mixer within the RF section 14 during the DC offset estimation. The signal-blocking device may include any structure that is capable of controllably blocking a signal including, for example, a switch-based device, an amplifier that may be turned off, and others. After the DC offset has been estimated, the signal-blocking device may be deactivated so that the received signal may once again reach the mixer. The estimated DC offset value may then be applied to the subtractor 16 to reduce a DC offset component in the output signal of the RF section 14. As used herein, the term "block" may refer to a condition of substantial signal attenuation, but does not necessarily refer to total or near total signal attenuation.

Figure 2:
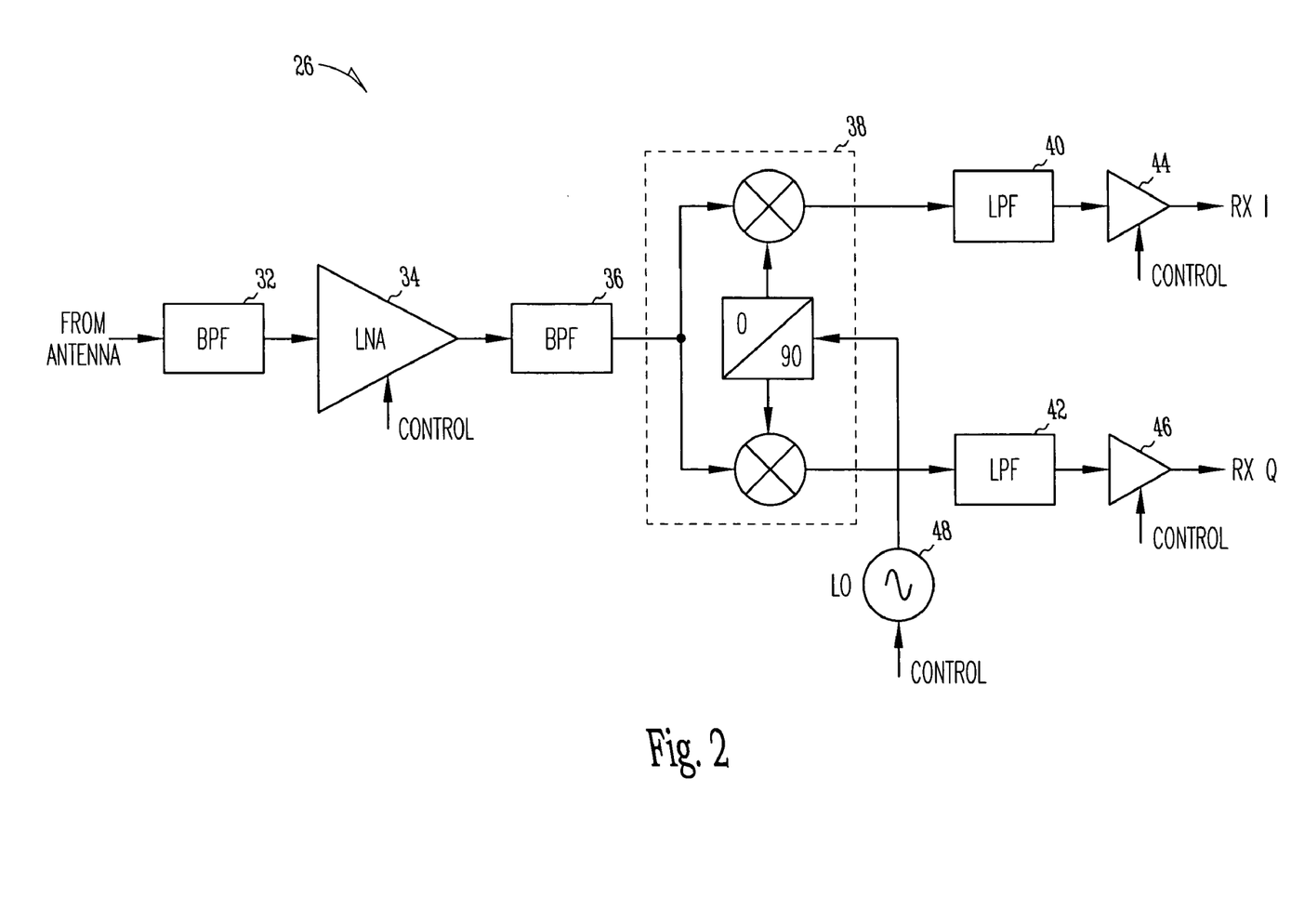
FIG. 2 is a block diagram illustrating an RF section of a wireless receiver in accordance with an embodiment of the present invention.

FIG. 2 is a block diagram illustrating an RF section 26 of a wireless receiver in accordance with an embodiment of the present invention. The RF section 26 may be used, for example, within the wireless receiver 10 of FIG. 1. As illustrated, the RF section 26 includes: a first bandpass filter (BPF) 32, a low noise amplifier (LNA) 34, a second BPF 36, a quadrature mixer 38, first and second low pass filters 40, 42, first and second variable gain amplifiers 44, 46, and a local oscillator (LO) 48. The first BPF 32 acts as a preselector to appropriately filter a received signal to remove or reduce energy that is outside a predetermined band. The LNA 34 amplifies the received signal in a low noise manner. The second BPF 36 again filters the received signal before it is delivered to the quadrature mixer 38. The quadrature mixer 38 down converts the received signal based on an LO signal received from the LO 48. The mixer 38 down converts the received signal directly to base band without generating an intermediate frequency (IF) signal. Thus, the RF section 26 of FIG. 2 is a form of direct conversion receiver and the frequency of the LO signal will be substantially the same as the received signal that is desired to be detected. The first and second low pass filters 40, 42 filter the down converted quadrature output signals of the mixer 38 in a manner that isolates signal energy within a band about DC. The first and second variable gain amplifiers 44, 46 and the LNA are part of an automatic gain control (AGC) loop that is designed to maintain an appropriate signal level at an output of the RF section 26 (e.g., to ensure that the signal level is within a dynamic range of the A/D converter 18). Although a quadrature mixer 38 is used in the illustrated embodiment, it should be appreciated that the inventive principles may be used in connection with any down conversion mixer architecture.

As illustrated in FIG. 2, the LNA 34, the LO 48, and the first and second variable gain amplifiers 44, 46 are controlled by the baseband controller 20. In one operational approach, the baseband controller 20 may result in the frequency of the LO 48 and the gain of the first and second variable gain amplifiers 44, 46 and the LNA being set based on a signal burst to be received by the receiver 10 at a future point in time. The LO 48 will be set based on a known frequency associated with the signal burst to be received. The gain will be set based on an AGC estimate of the level of gain that will be required to maintain the desired signal level at the output of the RF section 26 when the signal burst is ultimately received. The AGC estimate may be determined based upon, for example, signal levels associated with one or more previously received bursts (e.g., by averaging). Alternatively, the AGC estimate may be determined by preceding the DC estimation procedure with another procedure of taking measurements of the signal level.

Either before, concurrent with, or after the LO 48 and the first and second variable gain amplifiers 44, 46 are set for the future burst, the baseband controller 20 will deactivate the LNA 34, effectively blocking the flow of receive energy to the input of the mixer 38. This deactivation may be achieved by, for example, removing bias from the LNA 34. Other techniques are also possible. When the receive energy has been blocked and the LO 48 and first and second variable gain amplifiers 44, 46 have been appropriately set, the DC estimation unit 22 (see FIG. 1) is activated to estimate the DC offset at the output of the RF section. The baseband controller 20 eventually reactivates the LNA 34 (e.g., by reapplying bias, etc.) before the corresponding signal 30 burst is received by the wireless receiver 10. Either before, concurrently, or after the LNA 34 is reactivated, but before the signal burst is received, the DC estimation unit 22 delivers the DC offset estimate to the subtractor 16 via the D/A converter 24. Thus, when the signal burst is eventually received by the antenna 12, appropriate DC offset reduction will be in place.

Figure 3:
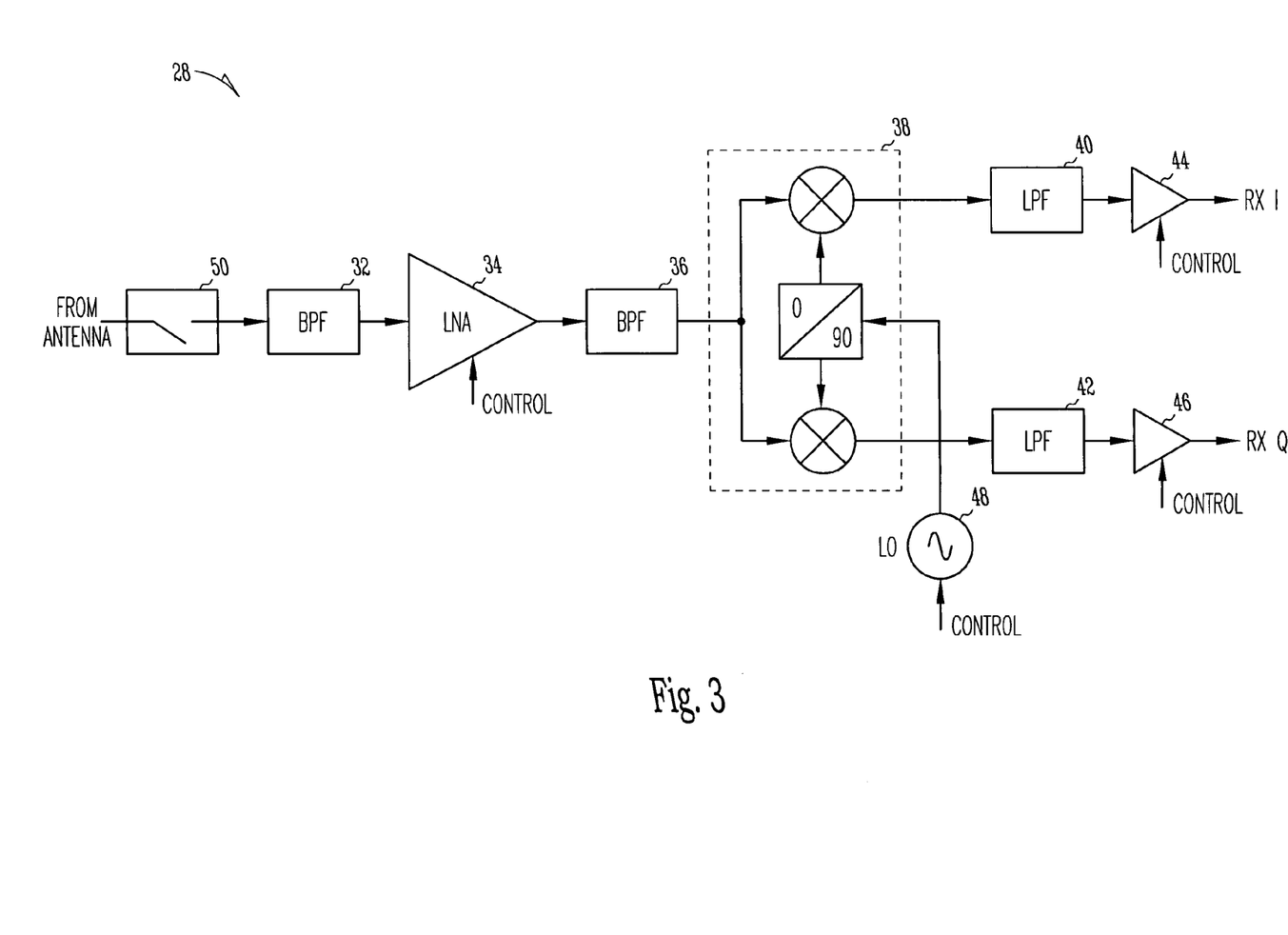
FIG. 3 is a block diagram illustrating an RF section of a wireless receiver in accordance with another embodiment of the present invention.

FIG. 3 is a block diagram illustrating an RF section 28 of a wireless receiver in accordance with another embodiment of the present invention. The RF section 28 of FIG. 3 is similar to the RF section 26 of FIG. 2, but a switch 50 has been added between the antenna and the first BPF 32. Thus, instead of deactivating the LNA 34 to block the flow of receive energy to the mixer 38, the baseband controller 20 may appropriately control the switch 50. In the illustrated embodiment, the switch 50 is an in-line switch. Thus, the controller 20 may open the switch to block the receive signal (i.e., create an open circuit condition in the signal flow path). In another possible approach, a shunt switch to ground is used. In this approach, the baseband controller 20 will close the switch, thus creating a short circuit along the signal flow path, to block the receive signal. In yet another approach, the switch connects the antenna to a transmit section while the DC estimate is measured. Many alternative signal blocking switch arrangements are also possible. The switch 50 may be located anywhere along the path of the receive signal between the antenna 12 and the mixer 38. Preferably, the switch 50 will be located before the LNA 34 so that DC offset resulting from leakage of LO signal into the antenna will also effect the DC estimate. It should be understood that the RF section architectures illustrated in FIGS. 2 and 3 are merely examples of possible architectures that may be used in accordance with the present invention. Many other architectures may alternatively be used.

In at least one embodiment of the present invention, the inventive principles are implemented within a time division multiple access (TDMA) based receiver. In a TDMA system, a number of distinct time slots are defined for use in communicating information. A time slot typically represents an individual channel in the system. Users in the system may be assigned one or more predetermined time slots for use in transmitting and/or receiving information (e.g., one time slot for transmitting and one time slot for receiving). A wireless receiver in a TDMA system therefore knows when signal bursts will be received by the receiver for a corresponding user. When used within a TDMA-based system, the above-described offset estimation techniques may be implemented within the time interval between received bursts. To conserve energy, the LNA 34 can be deactivated for almost the entire period between successive bursts. Also to conserve energy, it may be desirable to deactivate the LO 48 and the first and second variable gain amplifiers 44, 46 for at least a portion of the period between successive bursts. For example, in one approach, the LO 48 and the first and second variable gain amplifiers 44, 46 are activated and appropriately configured just long enough to achieve an accurate estimate of the DC offset before the next signal burst is received. These units may then remain activated and configured while the burst is being received and then be deactivated after the burst has been fully received. This process could then be repeated for the subsequent receive time slot associated with the user. The appropriate AGC level and LO frequency may change from burst to burst and the receiver will typically know those values before the next burst is received.

In some cases, there will be little or no a priori knowledge of the signal level of a next burst to be received. This may occur, for example, when detecting a neighbor cell transmission. In such a case, the AGC gain should be adjusted before the DC offset estimate is made. To adjust the gain, the receive signal must be coupled to the input of the mixer (i.e., be unblocked). The gain can then be varied while the baseband signal level is monitored. This process may involve one or more iterations of setting the gain and measuring the resulting signal level. Once enough information has been collected to accurately predict an appropriate AGC level for a subsequent burst, the above-described DC offset estimation techniques may be resumed.

Figure 4:
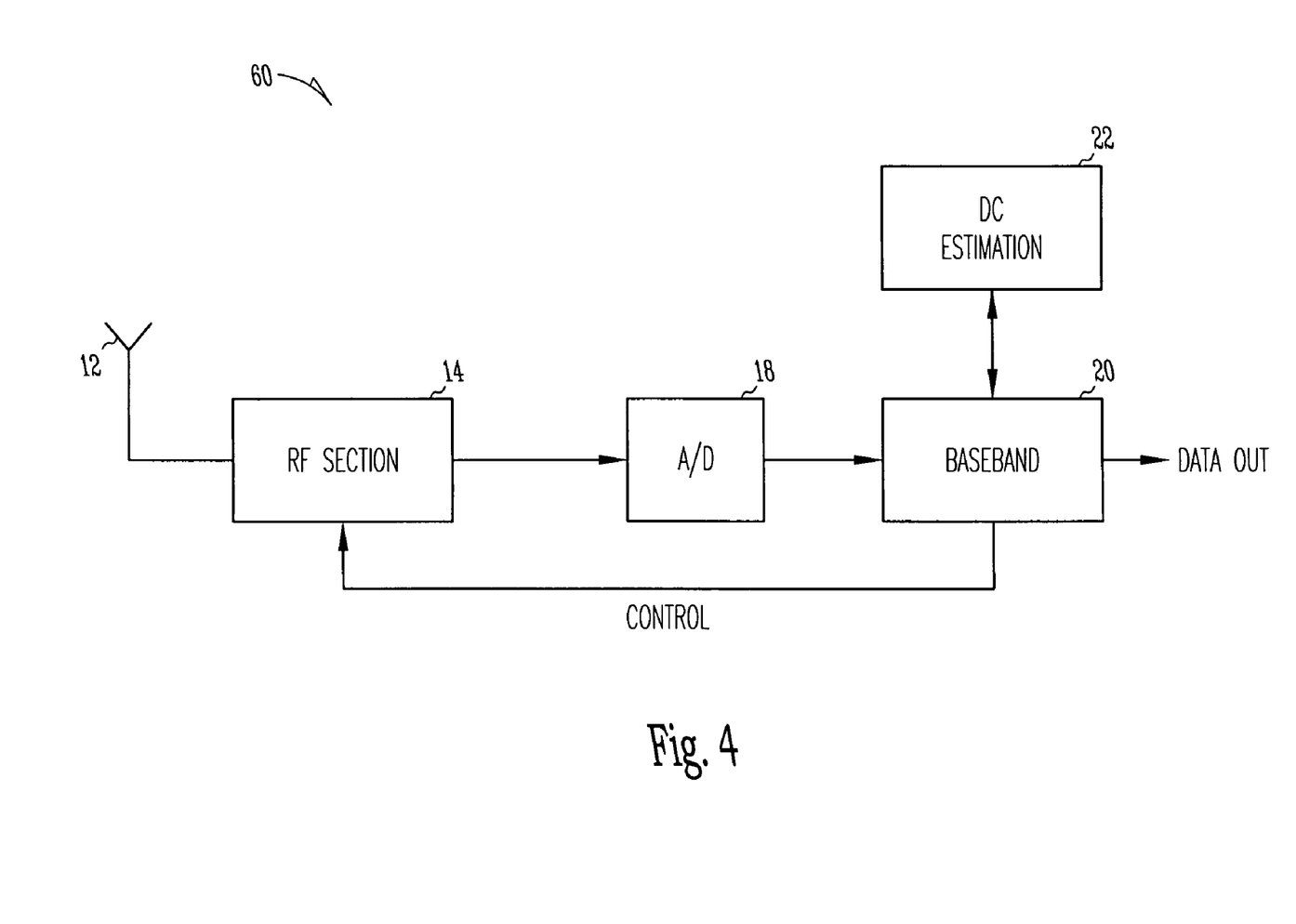
FIG. 4 is a block diagram illustrating a wireless receiver in accordance with another embodiment of the present invention.

In the receiver 10 of FIG. 1, the estimated DC offset is directly subtracted from the output of the RF section 14. Because the DC offset estimate is subtracted prior to analog-to-digital conversion, the number of bits required in the A/D converter 18 may be reduced (e.g., in cases of severe DC offset) and a less complex (and less expensive) converter may be used. In an alternative approach, the estimated DC offset value is subtracted within the baseband controller of a wireless receiver. FIG. 4 is a block diagram illustrating a wireless receiver 60 implementing such an approach. As shown, the wireless receiver 60 does not include a feedback path for the DC offset estimate. Instead, the DC estimation unit 22 communicates the DC offset estimate back to the baseband controller 20 which then subtracts the estimate from the digitized receive signal information at the appropriate time.

Figure 5:
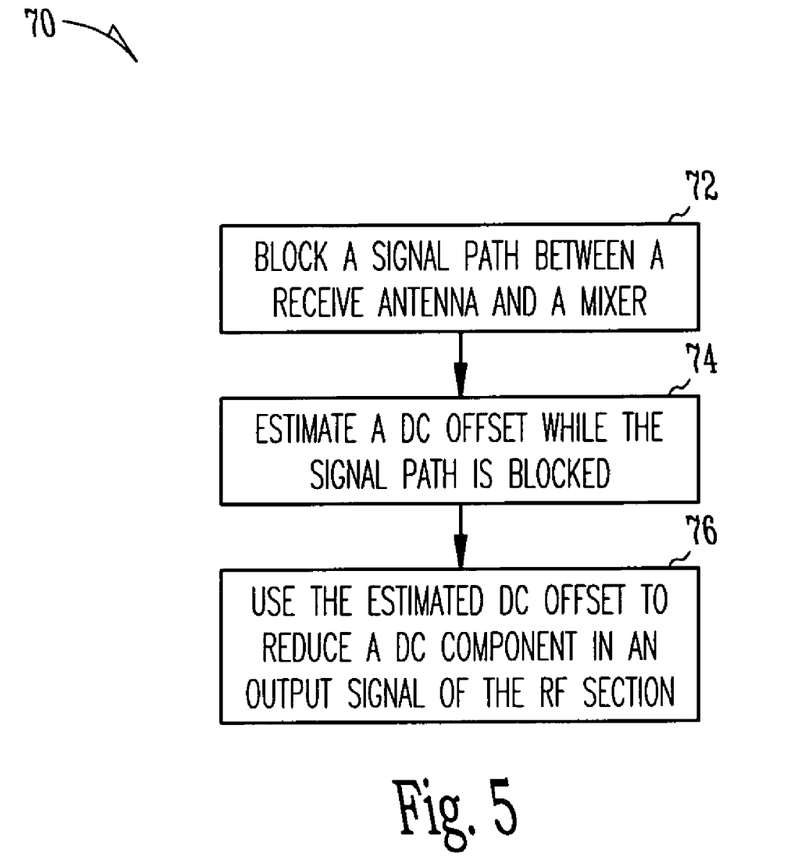
FIG. 5 is a flow chart illustrating a method for reducing a DC offset within a signal in a wireless receiver in accordance with an embodiment of the present invention.

FIG. 5 is a flow chart illustrating a method 70 for reducing DC offset within a signal in a wireless receiver in accordance with an embodiment of the present invention. First, a signal path between a receive antenna and a mixer is blocked (block 72). While the signal path is blocked, a DC offset at the output of an RF section of the wireless receiver is estimated (block 74). The estimate may be made, for example, by averaging a plurality of consecutive sample values. The estimated DC offset value is subsequently used to reduce a DC component within an output signal of the RF section (block 76). To reduce the DC component within the output signal, the estimated DC offset value may be directly subtracted from the analog output signal of the RF section. In an alternative approach, the estimated DC offset value may be subtracted from a digital representation of the output signal. Other techniques may alternatively be used.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for receiving comprising:
   blocking a signal path between a receive antenna and a mixer within an RF section of a wireless receiver by deactivating an RF low-noise amplifier (LNA) within the signal path;
   estimating at the output of the RF section of the wireless receiver while the signal path is blocked; and
   subsequently using the estimated DC offset to reduce a DC component at the output of the RF section,
   wherein the blocking and the estimating are performed within time intervals between received signal bursts of time-division multiple access (TDMA) signals, and
   wherein the method further comprises:
   deactivating a local oscillator (LO) and a baseband frequency variable gain amplifier (VGA) within the RF section during at least a portion of the time intervals between the received signal bursts to reduce energy consumption, the LO and the baseband frequency VGA to remain activated during the estimating.

2. The method of claim 1, wherein:
   estimating the DC offset includes converting an output signal of the RF section to a digital representation and estimating the DC offset using the digital representation, and
   wherein the deactivating the RF LNA is performed at a time after a signal burst of the TDMA signals is fully received.

3. The method of claim 2, wherein:
   subsequently using the estimated DC offset includes subtracting the estimated DC offset from an analog output signal of the RF section.

4. The method of claim 2, wherein:
   subsequently using the estimated DC offset includes subtracting the estimated DC offset from a digital representation of the output signal of the RF section.

5. The method of claim 1 further comprising predicting a VGA level for the baseband frequency VGA and a LO frequency for the LO for use in receiving a subsequent signal burst of the TDMA signals,
   wherein the RF LNA is not deactivated during at least a portion of the time intervals between the received signal bursts when the predicting is being performed.

6. The method of claim 5
   wherein the predicting comprises varying a gain of the baseband frequency VGA while monitoring a baseband signal level output of the VGA while the RF LNA is not deactivated,
   wherein during the blocking and estimating, the gain and the LO frequency are set based on the prediction, and
   wherein the gain and the LO frequency are set for receipt of the subsequent signal burst based on the prediction.

7. The method of claim 1, wherein:
   blocking a signal path includes reflecting back energy flowing through the signal path by deactivating the RF LNA.

8. A method for use in reducing DC offset in a wireless receiver, comprising:
   blocking a signal path between a receive antenna and a mixer by deactivating an RF low-noise amplifier (LNA) within the signal path;
   applying an LO signal to the mixer that is selected to process a signal burst to be received by the wireless receiver at a future time;
   applying a gain control signal to a variable gain amplifier (VGA) within the wireless receiver, said gain control signal being selected to process the signal burst to be received by the wireless receiver at the future time; and
   estimating a DC offset at an output of the VGA when the signal path is being blocked and the LO signal and the gain control signal are being applied,
   wherein the blocking, the applying the LO signal, the applying the gain control signal and the estimating are performed within time intervals between received signal bursts of time-division multiple access (TDMA) signals, and wherein the method further comprises:
deactivating the VGA and a local oscillator (LO) that generates the LO signal during at least a portion of the time intervals between the received signal bursts to reduce energy consumption, the LO and the VGA to remain activated during the estimating.

9. The method of claim 8, wherein:
estimating a DC offset includes converting an output signal of the variable gain amplifier to a digital representation and estimating the DC offset based on the digital representation, and
wherein the deactivating the RF LNA is performed at a time after a signal burst of the TDMA signals is fully received.

10. The method of claim 9, comprising:
using the estimated DC offset to reduce a DC component within an output signal of the variable gain amplifier.

11. The method of claim 9, comprising:
using the estimated DC offset to reduce a DC component within a digital representation of an output signal of the variable gain amplifier.

12. The method of claim 8, comprising:
unblocking the signal path between the receive antenna and the mixer by activating the RF LNA before the signal burst is received while continuing to apply the local oscillator signal and the gain control signal.

13. The method of claim 8, wherein:
said wireless receiver is part of a communication system using the TDMA signals, and
wherein said signal burst to be received by the wireless receiver at a future time includes information to be received within a known time slot associated with the wireless receiver.

14. The method of claim 13, comprising:
determining, before blocking said signal path, said gain control signal to be applied to said variable gain amplifier for use in receiving a subsequent signal burst of the TDMA signals,
wherein the RF LNA is not deactivated when the gain control signal is being determined, and
wherein the determining is performed during at least a portion of the time intervals between received signal bursts.

15. The method of claim 14, wherein:
determining includes iteratively applying gain control values to said variable gain amplifier while measuring an output level of the VGA while the RF LNA is not deactivated, and
wherein during the blocking and estimating, the determined gain control values are applied to the VGA and used for receipt of the subsequent signal burst.

16. A wireless receiver comprising:
an RF section having a mixer to down convert a received signal based on an LO signal applied to the mixer; and
a controller to estimate a DC offset at an output of the RF section during a period when a received signal is blocked from reaching the mixer,
wherein the controller blocks a signal path between a receive antenna and the mixer by deactivating an RF low-noise amplifier (LNA) within the signal path,
wherein the controller subsequently uses the estimated DC offset to reduce a DC component at the output of the RF section,
wherein the controller blocks the signal path and estimates the DC offset within time intervals between received signal bursts of time-division multiple access (TDMA) signals,
wherein the controller further deactivates a local oscillator (LO) and a baseband frequency variable gain amplifier (VGA) within the RF section during at least a portion of the time intervals between the received signal bursts to reduce energy consumption, and
wherein the controller activates the LO and the baseband frequency VGA during the estimating and the blocking.

17. The wireless receiver of claim 16, wherein:
said controller estimates the DC offset while a first LO signal is being applied to the mixer, said first LO signal being selected to process a signal burst to be received by the wireless receiver at a future time, and
wherein the deactivating of the RF LNA is performed at a time after a signal burst of the TDMA signals is fully received.

18. The wireless receiver of claim 16, wherein:
the variable gain amplifier is to amplify an output signal of the mixer by a controllable gain value, said variable gain amplifier having an input to receive a gain control signal.

19. The wireless receiver of claim 18, wherein:
said controller estimates the DC offset while a first gain control signal is being applied to the variable gain amplifier, said first gain control signal being selected to process a subsequent signal burst to be received by the wireless receiver at a future time.

20. The wireless receiver of claim 16, wherein:
said controller determines a gain control value for the VGA for use in receiving a subsequent signal burst of the TDMA signals, and
wherein the RF LNA is not deactivated during at least a portion of the time intervals between the received signal bursts when the determining is being performed.

21. The wireless receiver of claim 20, wherein:
the controller determines the gain control value by varying a gain of the VGA while monitoring a baseband signal level output of the VGA while the RF LNA is not deactivated,
wherein during the blocking and estimating by the controller, the controller sets the gain of the VGA using the determined gain control value, and
wherein the determined gain control value is used for receiving the subsequent signal burst.

22. The wireless receiver of claim 21, wherein:
said controller subtracting the DC offset estimate from an analog version of the output signal of the RF section.

23. A wireless receiver comprising:
a dipole antenna to receive an RF signal;
an RF section having a mixer to down convert the received RF signal based on an LO signal applied to the mixer and an RF low-noise amplifier (LNA) controllably block the received signal from reaching the mixer; and
a controller to deactivate the RF LNA to block the received signal when an estimate of DC offset at an output of the RF section is to be made,
wherein the controller subsequently uses the estimated DC offset to reduce a DC component at the output of the RF section,
wherein the controller deactivates the RF LNA and estimates the DC offset within time intervals between received signal bursts of time-division multiple access (TDMA) signals,
wherein the controller further deactivates a local oscillator (LO) and a baseband frequency variable gain amplifier (VGA) within the RF section during at least a portion of the time intervals between the received signal bursts to reduce energy consumption, and wherein the controller activates the LO and the baseband frequency VGA during the estimating and the blocking.

24. The wireless receiver of claim 23, wherein:

the deactivation of the RF LNA is performed by the controller at a time after a signal burst of the TDMA signals is fully received.

25. The wireless receiver of claim 23, wherein:

the controller predicts a VGA level for the baseband frequency VGA and a LO frequency for the LO for use in receiving a subsequent signal burst of the TDMA signals, wherein the RF LNA is not deactivated during at least a portion of the time intervals between the received signal bursts when the predicting is being performed.

26. The wireless receiver of claim 25, wherein:

said controller estimates the DC offset at the output of the RF section while the blocking device is blocking the received signal, wherein the controller varies a gain of the VGA while monitoring a baseband signal level output of the VGA while the RF LNA is not deactivated, wherein during the blocking and estimating, the controller sets the gain of the VGA based on the prediction, and wherein the controller further sets the gain of the VGA for receiving the subsequent signal burst.

27. The wireless receiver of claim 26, wherein:

said variable gain amplifier is to amplify an output signal of the mixer based on a gain control signal, wherein said controller estimates the DC offset while a first LO signal is being applied to the mixer and a first gain control signal is being applied to the variable gain amplifier, said first LO signal and said first gain control signal being selected to process the subsequent signal burst to be received by the wireless receiver at a future time.

28. The wireless receiver of claim 26, comprising:

a subtractor to subtract the estimated DC offset from an analog output signal of the RF section.

29. The wireless receiver of claim 28, comprising:

a digital to analog converter to convert the estimated DC offset to an analog representation for use by the subtractor.

30. The wireless receiver of claim 23, comprising:

an analog to digital converter to convert an output signal of the RF section to a digital representation for use by the controller.

* * * * *

UNITED STATES PATENT AND TRADEMARK OFFICE
CERTIFICATE OF CORRECTION

PATENT NO. : 7,054,607 B2
APPLICATION NO. : 10/260856
DATED : May 30, 2006
INVENTOR(S) : Binshtok et al.

Page 1 of 1

It is certified that error appears in the above-identified patent and that said Letters Patent is hereby corrected as shown below:

On the Title page, (56), under "U.S. Patent Documents", in column 2, line 1, after "6,753,727" delete "B1 *" and insert -- B2 * --, therefor.

On the Title page, in "Assistant Examiner", in column 2, line 1, delete "Thuan T Nguyen" and insert -- Thuan T. Nguyen --, therefor.

In column 8, line 52, in Claim 23, after "(LNA)" insert -- to --.

Signed and Sealed this

Seventh Day of November, 2006

JON W. DUDAS
*Director of the United States Patent and Trademark Office*